(12) United States Patent
Carrotte et al.

(10) Patent No.: US 11,828,232 B2
(45) Date of Patent: Nov. 28, 2023

(54) FUEL INJECTION

(71) Applicant: ROLLS-ROYCE plc, London (GB)

(72) Inventors: Jonathan F. Carrotte, Loughborough (GB); Anthony John Moran, Paisley (GB); Mark Brend, Loughborough (GB); Mark Cassell, Loughborough (GB); Maxwell Williams, Loughborough (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/476,174

(22) Filed: Sep. 15, 2021

(65) Prior Publication Data

US 2022/0099025 A1    Mar. 31, 2022

(30) Foreign Application Priority Data

Sep. 30, 2020 (GB) ...................................... 2015452
Sep. 30, 2020 (GB) ...................................... 2015453

(Continued)

(51) Int. Cl.
*F02C 7/22*   (2006.01)
*F23R 3/28*   (2006.01)
(Continued)

(52) U.S. Cl.
CPC ................ *F02C 7/224* (2013.01); *F02C 3/20* (2013.01); *F02C 3/22* (2013.01); *F02C 7/04* (2013.01);
(Continued)

(58) Field of Classification Search
CPC .... F02C 3/22; F02C 7/22; F02C 7/222; F23R 3/286; F23R 3/28; F23R 3/045;
(Continued)

(56) References Cited

U.S. PATENT DOCUMENTS 665,202 A    1/1901 Gabel
2,813,672 A    11/1957 Ong et al.
(Continued)

FOREIGN PATENT DOCUMENTS

CN    106051827 A    10/2016
CN    107630767 A    1/2018
(Continued)

OTHER PUBLICATIONS

Apr. 26, 2021 Search Report issued in Great Britain Application No. 2017014.8.
(Continued)

*Primary Examiner* — Katheryn A Malatek
*Assistant Examiner* — Jingchen Liu
(74) *Attorney, Agent, or Firm* — Oliff PLC

(57) ABSTRACT

A direct injection fuel system is shown for injecting hydrogen fuel into a gas turbine combustor. The fuel injection system includes a plurality of fuel injector blocks. Each fuel injector block includes a fuel admission duct having an inlet for receiving hydrogen fuel from a fuel supply, an outlet for delivering hydrogen fuel into the combustor and a central axis extending from said inlet to said outlet. Each fuel injector block also includes an air admission duct located around the periphery of the fuel admission duct, having an inlet for receiving air from a diffuser and an outlet for delivering air into the combustor for mixing with the hydrogen fuel.

16 Claims, 16 Drawing Sheets

(30) Foreign Application Priority Data

Sep. 30, 2020 (GB) .................................... 2015454
Oct. 27, 2020 (GB) .................................... 2017014

(51) Int. Cl.

| | |
|---|---|
| F02C 3/22 | (2006.01) |
| F02C 7/04 | (2006.01) |
| F23R 3/04 | (2006.01) |
| F02C 3/20 | (2006.01) |
| F02C 9/40 | (2006.01) |
| F02C 7/224 | (2006.01) |
| F02C 7/143 | (2006.01) |
| F02C 7/18 | (2006.01) |
| F02C 7/14 | (2006.01) |

(52) U.S. Cl.
CPC .............. *F02C 7/14* (2013.01); *F02C 7/143* (2013.01); *F02C 7/18* (2013.01); *F02C 7/22* (2013.01); *F02C 7/222* (2013.01); *F23R 3/04* (2013.01); *F23R 3/286* (2013.01); *F02C 9/40* (2013.01); *F05D 2220/32* (2013.01); *F05D 2240/35* (2013.01)

(58) Field of Classification Search
CPC ...... F23R 3/10; F23R 3/04; F23R 3/34; F23R 3/343; F23D 11/106; F05D 2220/75
See application file for complete search history.

(56) References Cited

U.S. PATENT DOCUMENTS

| | | | |
|---|---|---|---|
| 3,237,401 A | 3/1966 | Peters et al. | |
| 3,282,323 A | 11/1966 | Mandius et al. | |
| 3,489,009 A | 1/1970 | Ronald | |
| 3,688,495 A | 9/1972 | Fehler et al. | |
| 3,720,058 A | 3/1973 | Collinson et al. | |
| 3,721,088 A | 3/1973 | Lewis | |
| 3,878,678 A | 4/1975 | Huellmantel et al. | |
| 3,918,253 A | 11/1975 | Smith | |
| 4,100,733 A | 7/1978 | Striebel et al. | |
| 4,942,733 A | 7/1990 | Tosford | |
| 5,185,541 A | 2/1993 | Jensen | |
| 5,315,818 A | 5/1994 | Smith | |
| 5,327,755 A | 7/1994 | Thompson | |
| 5,363,641 A | 11/1994 | Dixon et al. | |
| 5,729,967 A | 3/1998 | Joos et al. | |
| 5,832,718 A | 11/1998 | Suttrop | |
| 6,079,222 A | 6/2000 | Fetescu et al. | |
| 8,042,339 B2 | 10/2011 | Lacy et al. | |
| 9,388,985 B2 | 7/2016 | Wu et al. | |
| 10,465,909 B2 | 11/2019 | Boardman et al. | |
| 10,989,117 B2 | 4/2021 | Roberge | |
| 11,041,439 B2 | 6/2021 | Roberge | |
| 11,448,133 B2 | 9/2022 | Cocks et al. | |
| 2004/0000146 A1 | 1/2004 | Inoue et al. | |
| 2004/0250797 A1 | 12/2004 | Shetley | |
| 2007/0082305 A1 | 4/2007 | Chen et al. | |
| 2007/0277528 A1 | 12/2007 | Homitz et al. | |
| 2008/0078160 A1 | 4/2008 | Kraemer et al. | |
| 2010/0031661 A1 | 2/2010 | Varatharajan et al. | |
| 2010/0050642 A1 | 3/2010 | Ziminsky | |
| 2010/0089066 A1 | 4/2010 | Mina | |
| 2010/0186413 A1 | 7/2010 | Lacy et al. | |
| 2010/0269507 A1 | 10/2010 | Khan et al. | |
| 2011/0016871 A1 | 1/2011 | Kraemer et al. | |
| 2011/0265488 A1 | 11/2011 | Lawson et al. | |
| 2012/0117978 A1 | 5/2012 | Allam | |
| 2014/0175803 A1 | 6/2014 | DePuy et al. | |
| 2015/0322857 A1 | 11/2015 | Ethier et al. | |
| 2016/0290650 A1 | 10/2016 | Abd El-Nabi et al. | |
| 2017/0284677 A1 | 10/2017 | Horikawa et al. | |
| 2017/0356390 A1 | 12/2017 | Frolov et al. | |
| 2018/0128492 A1 | 5/2018 | Boardman et al. | |
| 2018/0239376 A1 | 8/2018 | Olberding et al. | |
| 2019/0301369 A1 | 10/2019 | Muruganandam et al. | |
| 2020/0072466 A1* | 3/2020 | Akiyama | F23R 3/286 |
| 2020/0088102 A1 | 3/2020 | Roberge | |
| 2020/0318548 A1 | 10/2020 | Zager et al. | |
| 2021/0231050 A1 | 7/2021 | Olver et al. | |
| 2021/0340908 A1 | 11/2021 | Boucher et al. | |
| 2021/0348561 A1 | 11/2021 | Cocks et al. | |
| 2021/0404383 A1 | 12/2021 | Tomescu et al. | |
| 2022/0099020 A1 | 3/2022 | Palmer | |
| 2022/0163200 A1* | 5/2022 | Miura | F23R 3/28 |
| 2022/0195928 A1 | 6/2022 | Johnson et al. | |
| 2022/0297844 A1 | 9/2022 | Mackin et al. | |
| 2022/0403777 A1 | 12/2022 | St-Laurent et al. | |
| 2023/0014495 A1* | 1/2023 | Fukuba | F23D 11/102 |

FOREIGN PATENT DOCUMENTS

| | | | |
|---|---|---|---|
| EP | 0638715 A1 | 2/1995 | |
| EP | 3 168 536 A1 | 5/2017 | |
| EP | 3 620 719 A1 | 3/2020 | |
| EP | 3 623 360 A1 | 3/2020 | |
| EP | 3 623 604 A1 | 3/2020 | |
| EP | 3623602 A1 | 3/2020 | |
| EP | 3623603 A1 | 3/2020 | |
| EP | 3 168 536 B1 | 6/2020 | |
| EP | 3907387 A1 | 11/2021 | |
| FR | 2 687 433 A1 | 8/1993 | |
| GB | 2126658 A | 3/1984 | |
| GB | 2 240 813 A | 8/1991 | |
| GB | 2 350 158 A | 11/2000 | |
| GB | 2 449 267 A | 11/2008 | |
| WO | 2014/105327 A1 | 7/2014 | |
| WO | 2016/160010 A1 | 10/2016 | |
| WO | WO-2022018119 A1 * | 1/2022 | |

OTHER PUBLICATIONS

Mar. 8, 2021 Search Report issued in Great Britain Application No. 2015452.2.
Mar. 26, 2021 Search Report issued in Great Britain Application No. 2015454.8.
Jan. 10, 2021 Search Report issued in Great Britain Application No. 2015453.0.
U.S. Appl. No. 17/476,110, filed Sep. 15, 2021 in the name of Carrote et al.
U.S. Appl. No. 17/476,129, filed Sep. 15, 2021 in the name of Palmer et al.
U.S. Appl. No. 17/476,311, filed Sep. 15, 2021 in the name of Palmer et al.
U.S. Appl. No. 17/487,575, filed Sep. 28, 2021 in the name of Palmer.
Feb. 10, 2022 Extended Search Report issued in European Patent Application No. 21196322.8.
Feb. 11, 2022 Extended Search Report issued in European Patent Application No. 21196323.6.
Feb. 11, 2022 Extended Search Report issued in European Patent Application No. 21198180.8.
Feb. 17, 2022 Search Report issued in European Patent Application No. 21196320.2.
Database WPI, Week 201677, Thomson Scientific, London, GB; AN 2016-686843; XP002805602, & CN 106 051 827A.
Mar. 2, 2022 Search Report issued in European Patent Application No. 21196324.4.
Jun. 9, 2022 Extended Search Report issued in European Patent Application No. 21196320.2.
Nov. 9, 2022 Office Action issued in U.S. Appl. No. 17/476,311.
Nov. 9, 2022 Office Action issued in U.S. Appl. No. 17/476,129.
Jul. 27, 2022 Office Action issued in U.S. Appl. No. 17/487,575.
Aug. 16, 2022 Office Action issued in U.S. Appl. No. 17/746,110.
Oct. 13, 2022 Office Action issued in U.S. Appl. No. 17/487,575.
Oct. 18, 2022 Office Action issued in U.S. Appl. No. 17/476,110.
Apr. 14, 2023 Office Action issued in U.S. Appl. No. 17/487,575.
Feb. 10, 2023 Office Action issued in U.S. Appl. No. 17/476,110.
Mar. 2, 2023 Office Action issued In U.S. Appl. No. 17/476,129.

(56) References Cited

OTHER PUBLICATIONS

Mar. 2, 2023 Office Action issued In U.S. Appl. No. 17/476,311.
Mar. 6, 2023 Office Action issued in U.S. Appl. No. 17/476,129.
Jun. 29, 2023 Office Action issued In U.S. Appl. No. 17/476,311.
Jul. 3, 2023 Office Action issued in U.S. Appl. No. 17/476,129.
May 12, 2023 Office Action issued in U.S. Appl. No. 17/476,110.
Sep. 13, 2023 Office Action issued in U.S. Appl. No. 17/487,575.

* cited by examiner

FUEL INJECTION

CROSS-REFERENCE TO RELATED APPLICATIONS

This application claims priority from United Kingdom Patent Application Nos 20 15 452.2, 20 15 453.0, and 20 15 454.8, all filed Sep. 30, 2020, and United Kingdom Patent Application No 20 17 014.8 filed Oct. 27, 2020, each of which is incorporated herein by reference in its entirety.

TECHNICAL FIELD

This disclosure relates to fuel injection for hydrogen-fuelled aero gas turbine engines.

BACKGROUND

In order to limit emissions of carbon dioxide, use of hydrogen as an alternative to hydrocarbon fuel in gas turbine engines has historically only been practical in land-based installations. Such engines are typically supplied with hydrogen derived from natural gas via concurrent steam methane reformation, which hydrogen is injected into large-volume series staged dry low $NO_x$ burners. This type of burner is not suitable for use in an aero engine primarily due to its size and the difficulties in maintaining stable operation during transient manoeuvres.

Experimental programmes have been conducted to develop aero engines operable to be fuelled with hydrogen, however these have typically been high-Mach after burning turbojets or expander cycles and thus not practical for use on civil airliners operating in the Mach 0.8 to 0.85 regime.

There is therefore a need for technologies for combustion of hydrogen in aero gas turbine installations, in particular around the overall engine cycle to for example minimise fuel consumption, the fuel delivery system to for example meter fuel accurately, and the fuel injection system to for example minimise emissions.

SUMMARY

The invention is directed towards fuel injection systems for injecting hydrogen fuel into a gas turbine combustor.

In an aspect, one such fuel injection system comprises a plurality of fuel injector blocks, each of which includes:
- a fuel admission duct having an inlet for receiving hydrogen fuel from a fuel supply, an outlet for delivering hydrogen fuel into the combustor;
- an air admission duct located around the periphery of the fuel admission duct, having an inlet for receiving air from a diffuser and an outlet for delivering air into the combustor for mixing with the hydrogen fuel.

In an embodiment, the air admission duct is configured to inject hydrogen at a non-zero angle relative to the central axis.

In an embodiment, the area of the air admission duct is from 2 to 200 times greater than the area of the outlet of the fuel admission duct.

In an embodiment, the area of the air admission duct is from 4 to 45 times greater than the area of the outlet of the fuel admission duct.

In an embodiment, the area of the air admission duct is from 5 to 180 times greater than the area of the outlet of the fuel admission duct.

In an embodiment, the area of the air admission duct is from 25 to 35 times greater than the area of the outlet of the fuel admission duct.

In an embodiment, a maximum dimension of the air admission duct is from 2 to 15 times greater than a maximum dimension of the outlet of the fuel admission duct.

In an embodiment, a maximum dimension of the air admission duct is from 4.3 to 6.75 times greater than a maximum dimension of the outlet of the fuel admission duct.

In an embodiment, the air admission duct is concentric with the fuel admission duct.

In an embodiment, the area of the inlet of the air admission duct is greater than the area of the outlet of the air admission duct.

In an embodiment, the area of the inlet of the air admission duct is from 1 to 1.5 times greater than the area of the outlet of the air admission duct.

In an embodiment, the air admission duct comprises a constant area section from its inlet to a first intermediate position, and a decreasing area section between the first intermediate position to its outlet.

In an embodiment, the fuel admission duct is defined by a peripheral wall extending from its inlet to its outlet, said peripheral wall having chamfered section between a second intermediate position and its outlet.

In an embodiment, the fuel injection system comprises from 500 to 4000 fuel injector blocks.

In another aspect, there is provided a method of designing a fuel injection system for injecting hydrogen fuel into a gas turbine combustor, comprising:
- obtaining a design of a standardised fuel injector block of the aforesaid type, the standardised fuel injector being capable of delivering a particular fuel mass flow performance and having fixed dimensions and geometry;
- obtaining a specification of the fuel mass flow requirements for the gas turbine engine;
- evaluating a quantity of standardised fuel injector blocks to form said fuel injector arrangement to meet the specification of the fuel mass flow requirements for the gas turbine engine, which evaluation process excludes any dimensional scaling of the standardised fuel injectors.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
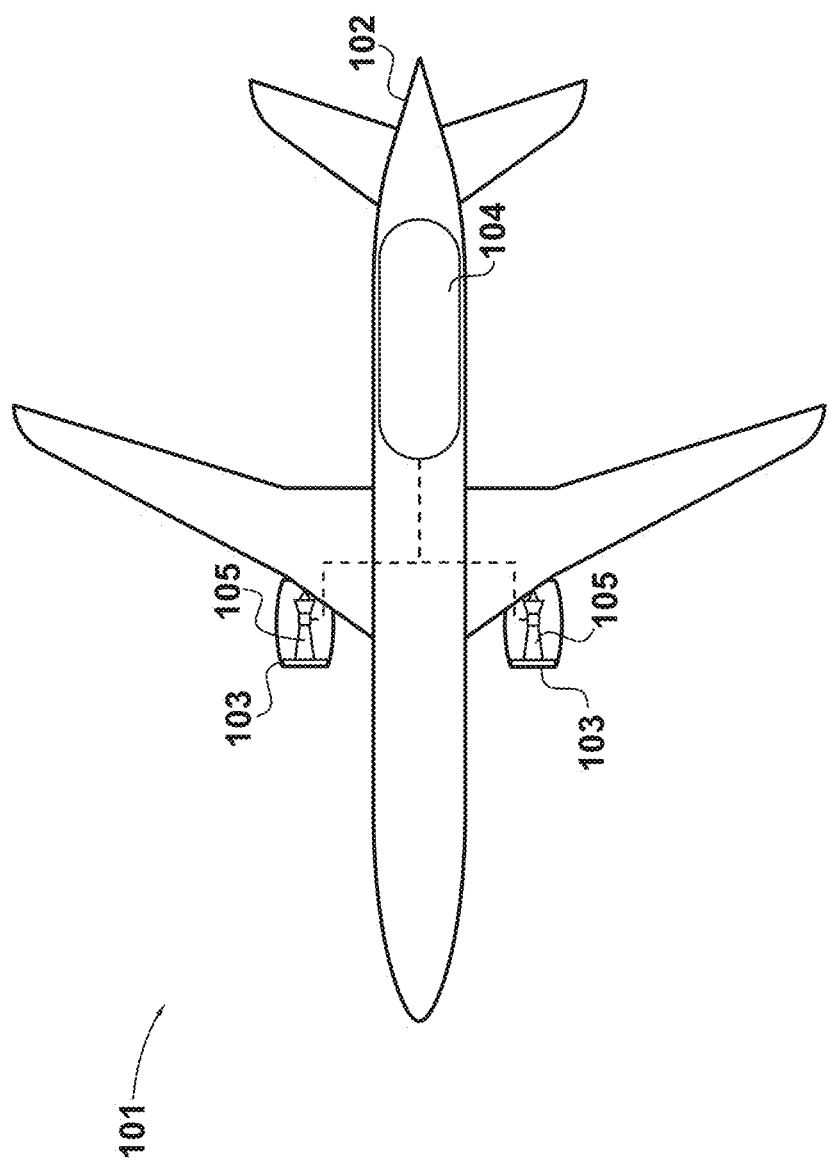
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103.

In the present embodiment, the turbofan engines 103 are geared turbofan engines. A hydrogen storage tank 104 located in the fuselage 104 for hydrogen fuel supply is connected with core gas turbines 105 in the turbofan engines 103 via a fuel delivery system. In the present embodiment, the hydrogen storage tank 104 is a cryogenic hydrogen storage tank and thus stores the hydrogen fuel in a liquid state, in a specific example at 20 kelvin. In this example, the hydrogen fuel is pressurised to a pressure from around 1 bar to around 3 bar, in a specific example 2 bar.

Figure 2:
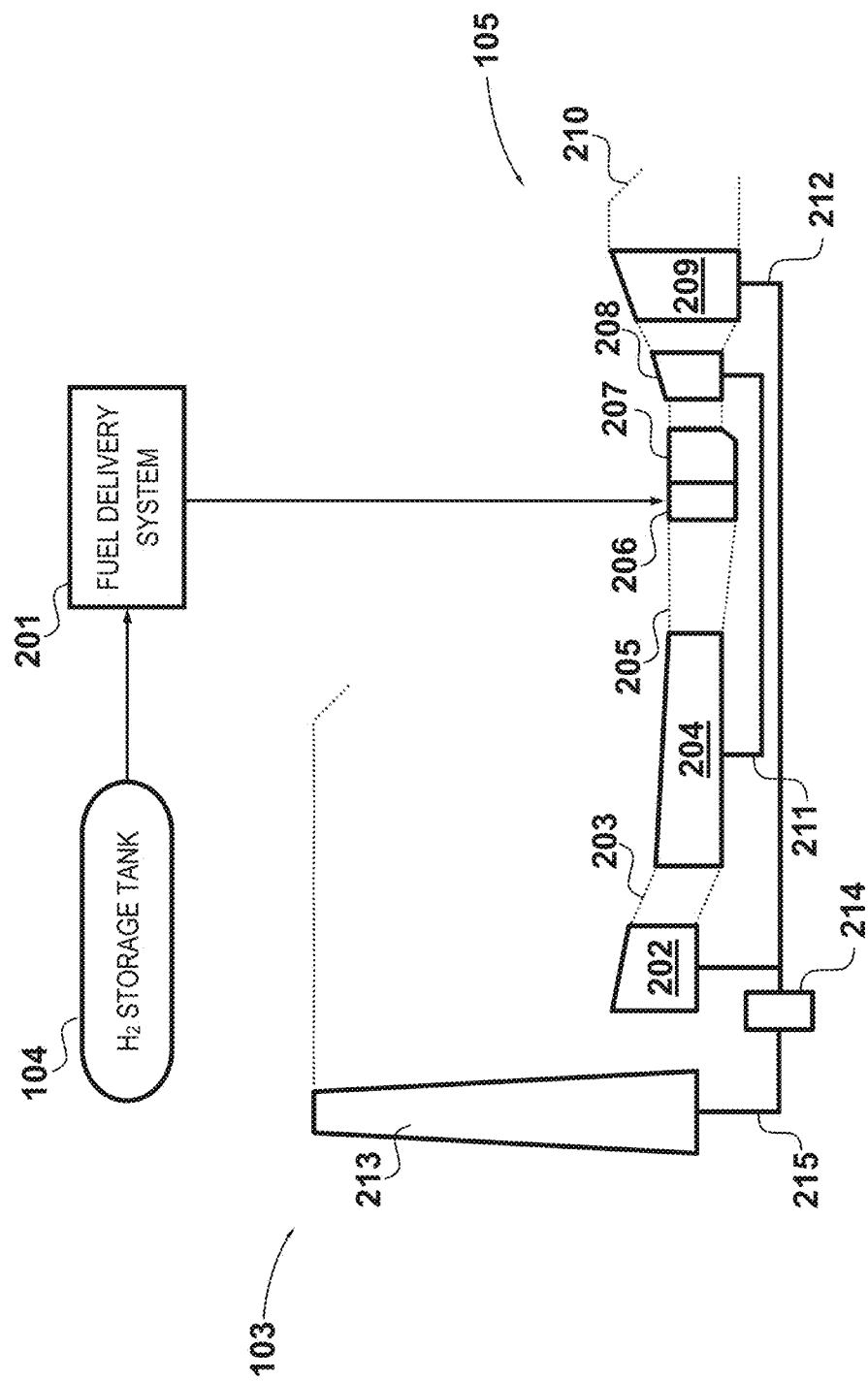
FIG. 2 is a block diagram identifying the flow of hydrogen fuel.

A block diagram identifying the flow of hydrogen fuel is shown in FIG. 2.

Hydrogen fuel is obtained from the hydrogen storage tank 104 by the fuel delivery system 201 and supplied to each core gas turbine 105. In the Figure, only one of the core gas turbines is shown for clarity. In this illustrated embodiment, the core gas turbine 105 is a simple cycle gas turbine engine. In other embodiments, as will be described with reference to FIGS. 7 to 11, complex cycles may be implemented via fuel-cooling of the gas path.

Referring again to FIG. 2, the core gas turbine 105 comprises, in fluid flow series, a low-pressure compressor 202, an inter-stage duct 203, a high-pressure compressor 204, a diffuser 205, a fuel injection system 206, a combustor 207, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

The fuel injection system 206 will be described further with reference to FIG. 12A onward.

As described previously, in the present embodiment, the turbofan engines 103 are geared turbofan engines. Thus in operation the low-pressure turbine 209 drives a fan 213 via a reduction gearbox 214. The reduction gearbox receives input drive from the second shaft 212 and provides output drive to the fan 213 via a fan shaft 215. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

Fuel Delivery System

Figure 3:
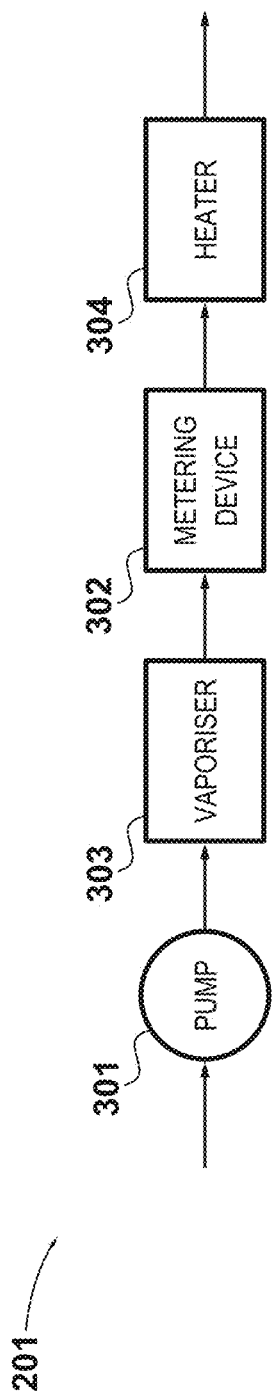
FIG. 3 shows a fuel delivery system.

In operation, the fuel delivery system 201 is configured to obtain hydrogen fuel from the hydrogen storage tank 104 and provide it to the fuel injection system 206 in the core gas turbine 105. FIG. 3 is a block diagram illustrating the fuel delivery system 201 in greater detail.

The fuel delivery system 201 comprises a pump 301, a metering device 302, and a fuel heating system for heating the hydrogen fuel to an injection temperature for the fuel injection system 206. In an embodiment, a vent system (not shown) may be included in the fuel delivery system 201 close to the fuel injection system 206 to vent hydrogen fuel should a rapid shut-off be required, for example in response to a shaft-break event. It is envisaged that the vent system may vent the excess hydrogen fuel into the bypass duct of the turbofan engine 103, or alternatively vent it outside of the nacelle of the engine 103. An igniter may be provided to flare off the excess hydrogen in a controlled manner.

In the present embodiment, the pump 301 is high-speed centrifugal pump. In a specific embodiment, it is configured to operate at 50000 rpm or more. In a specific embodiment, the centrifugal pump comprises an axial inducer to minimise the required inlet pressure and to accommodate multiphase flow in addition to the centrifugal impeller for developing the majority of the required pressure rise. In an alternative embodiment, a piston-type pump could be used.

In an embodiment, the pump 301 is located in the hydrogen storage tank 104. In this way leakage of hydrogen fuel past pump seals etc. is accommodated.

In an embodiment, the pump 301 is driven by a fuel turbine, as will be described with reference to FIG. 8.

Alternatively, the pump 301 could be driven by an air turbine supplied with compressor bleed, for example bleed from the high-pressure compressor 204. Alternatively, combustion products from the combustor 207 may be used to drive a dedicated turbine for driving the pump 301. In another embodiment, the pump 301 is driven via an electrical machine. In an embodiment, the drive means for the pump 301 are also located in the hydrogen storage tank 104.

In this embodiment, the metering device 302 is configured to meter the required quantity of fuel for the current fuel demand of the core gas turbine 105.

As will be appreciated, it is desirable to increase the temperature of the fuel from the 20 kelvin cryogenic storage condition to a temperature much closer to the firing temperature of the core gas turbine; of course this is subject to the constraint of not exceeding the autoignition temperature of the hydrogen fuel prior to admission into the combustor 207. In an example, the injection temperature is from 250 to 300 kelvin, for example 280 kelvin.

In the present embodiment, the fuel heating system comprises a vaporiser 303 for heating of the hydrogen fuel to implement a phase change. In the present embodiment, this takes place between the pump 301 and the metering device 302. In this way the metering device 302 meters gaseous hydrogen fuel. It is contemplated that in other embodiments, the order of operations may change.

In an embodiment, the vaporiser 303 is configured to raise the temperature of the hydrogen fuel to the required injection temperature. Thus, in such a configuration, the metering device 302 meters the hydrogen fuel at the injection temperature.

In another embodiment, the vaporiser 303 is configured to raise the temperature of the hydrogen fuel to a metering temperature less than the injection temperature. This could for example be from 100 to 200 kelvin, for example 150 kelvin. This reduces the risk of damage to electronic devices used for sensing temperature, pressure etc.

Further heating is implemented following the metering of hydrogen fuel by the metering device 302. In this example, this is achieved with a heater 304. The configuration of the vaporiser 303 and heater 304 may be substantially similar, and an example will be described further with reference to FIG. 10.

Additionally or alternatively, the fuel heating system may comprise one or more heat exchangers for raising the temperature of the hydrogen fuel by use of rejected heat from the core gas turbine 105. As will be described further with reference to FIGS. 7 to 11, this may be achieved by implementing a complex cycle configuration, for example fuel recuperation, intercooling, etc.

Figure 4:
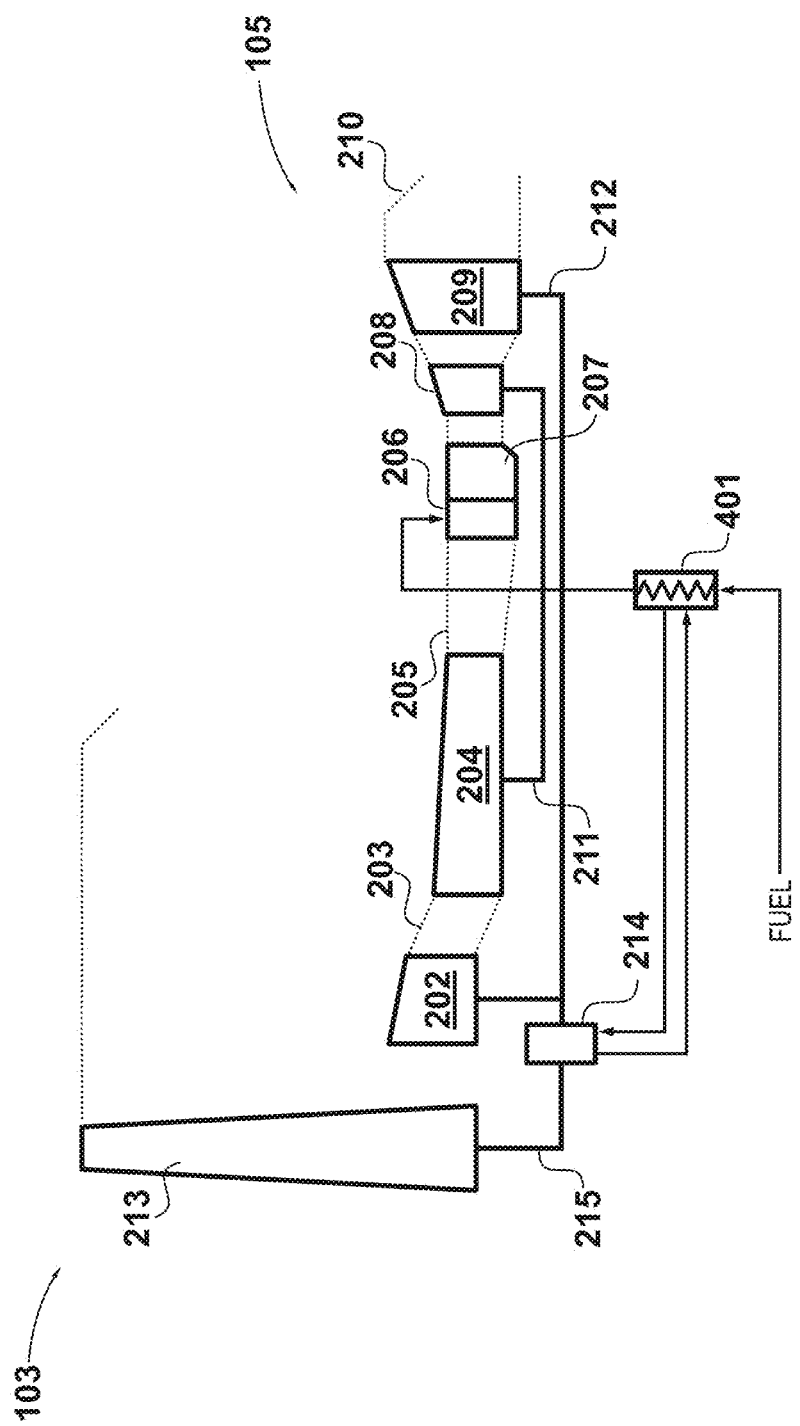
FIG. 4 shows a fuel-oil heat exchange arrangement for the fuel heating system of the fuel delivery system of FIG. 3.

However, even in a simple cycle configuration as contemplated herein, this fuel heating may be achieved by, for example, cooling one or more of the various oil systems in the core gas turbine 105. A specific example of such a configuration is shown in FIG. 4, in which the fuel heating system comprises a fuel-oil heat exchanger 401 for cooling lubricating oil from the reduction gearbox 214. In an example, even with a 99 percent efficient gearset, at maximum thrust it may still be required to reject around 750 kilowatts of heat from the gearbox oil system, which represents a significant opportunity for raising the temperature of the hydrogen fuel. It will be appreciated that other engine oil, such as main bearing lubrication oil, may also be cooled in a similar manner. It will also be appreciated that cooling air systems may be cooled a similar manner, with high-pressure compressor 204 discharge air being cooled by heat exchange with the hydrogen fuel prior to being delivered to the high-pressure turbine 208 for cooling thereof.

In a simple cycle configuration it has been determined that due to the significant heat capacity of the hydrogen fuel, even if it is utilised as a heatsink for engine waste heat, it will still not reach the required injection temperature without implementation of the vaporiser 303 and optionally the heater 304, depending on the chosen metering temperature. Further, even in a complex cycle configuration in which the heat of combustion products is recuperated into the hydrogen fuel, it has been determined that at certain points in the operational envelope there will be insufficient heat output from the engine to raise the fuel temperature to the injection temperature. Such occasions may include, for example, ground start, in-flight relight, end of cruise idle, etc.

Figure 5:
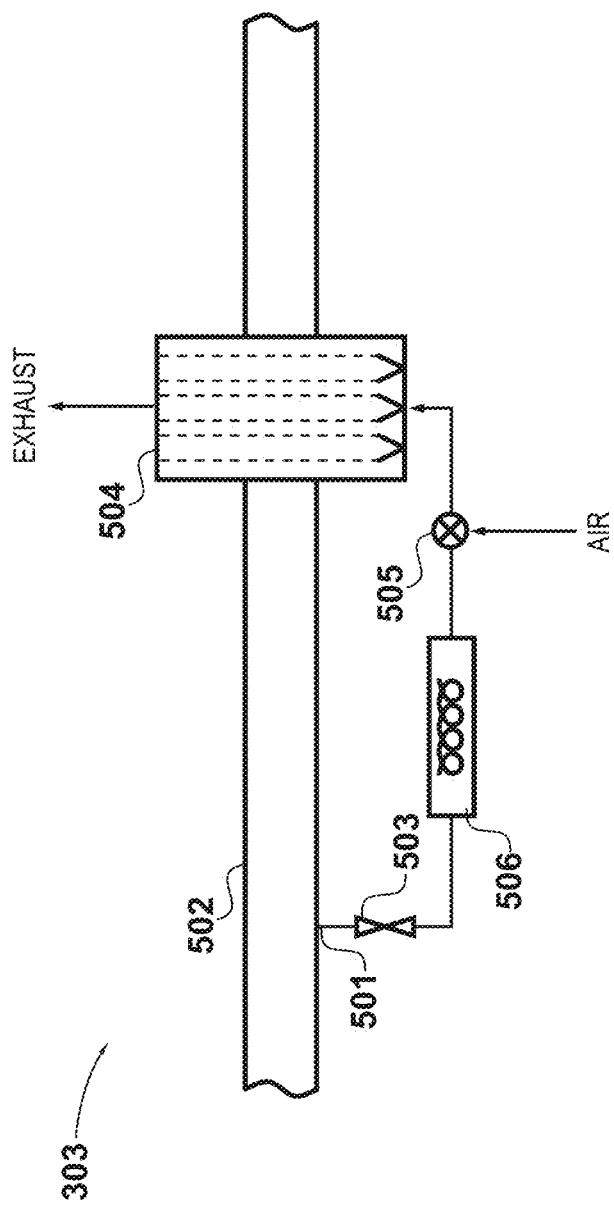
FIG. 5 shows a vaporiser of the fuel delivery system of FIG. 3.

An example configuration of the vaporiser 303 is shown in FIG. 5. Such a configuration may also be used for the heater 304.

The vaporiser 303 comprises an offtake 501 from a main fuel conduit 502. The amount of hydrogen bled from the main fuel conduit 502 is controlled by a valve 503. In operation, of the order of around 1 percent of the hydrogen fuel flow through the main fuel conduit 502 is bled for use in the vaporiser 303.

As described previously, hydrogen has very high specific and latent heat capacities; however as a gas it has a very low molecular weight and density, and thus it can be challenging to exchange heat in a compact way. Thus the vaporiser 303 vaporises the hydrogen fuel in the main fuel conduit 502 by combustion of the bled fuel in a burner 504 located in heat exchange relationship with the main fuel conduit 502. In the present embodiment, the burner 504 is concentric around the main fuel conduit 502, although it will be appreciated that other arrangements are possible.

In the present embodiment, air for combustion with the bled hydrogen fuel is bled from the high-pressure compressor 204. Alternatively, it may be bled from the low-pressure compressor 202. It will be appreciated that the air for combustion could be obtained from any other suitable location.

In the present example, the air and the bled hydrogen fuel are mixed in a pre-mixer 505, although in alternative embodiments it may be directly co-injected into the burner with the hydrogen fuel instead. Combustion products from the burner 504 are, in an embodiment, exhausted into the bypass duct of the turbofan engine 103. Alternatively, they may be exhausted outside the nacelle.

It should be understood that, in the present example, the products of combustion from the burner 504 are not mixed with the fuel in the main fuel conduit 502. In this respect, the vaporiser 303 therefore differs from a pre-burner system as used in staged combustion cycle rocket engines.

In steady state, there is enough heat emanating from the burner 504 to ensure vaporisation of the small amount of bled hydrogen fuel. At engine start or other cold conditions for example, the vaporiser 303 comprises a preheater 506 to ensure vaporisation of the bled hydrogen fuel prior to mixing with air in the pre-mixer 505. In a specific embodiment, the preheater 506 comprises an electric heating element, for example a coil. Alternatively, the preheater 506 could be simply configured as a boil volume, in which the ambient conditions therein contain sufficient enthalpy to boil the initial flow of bled hydrogen fuel prior to delivery to the pre-mixer 505 and the burner 504.

Embodiments of the metering device 302 are illustrated in FIGS. 6A and 6B.

Fuel flow on a conventional liquid-fuelled aero engine is typically controlled by means of a pressure regulating valve and a profiled translating spill valve which returns a proportion of the flow supplied by the pump back to the pump inlet. However, because hydrogen has an extremely low density and viscosity, it has a strong tendency to leak through any gap. A control system that relies on close clearances to minimise leakages will be highly problematic with hydrogen as the fuel, since there will be significant leakage with even very tight clearances and the significant thermal variations in a hydrogen system will preclude very tight clearances.

In the present embodiments, therefore, the metering device 302 uses a fixed orifice which inherently has no moving parts and may therefore be sealed.

Figure 6:
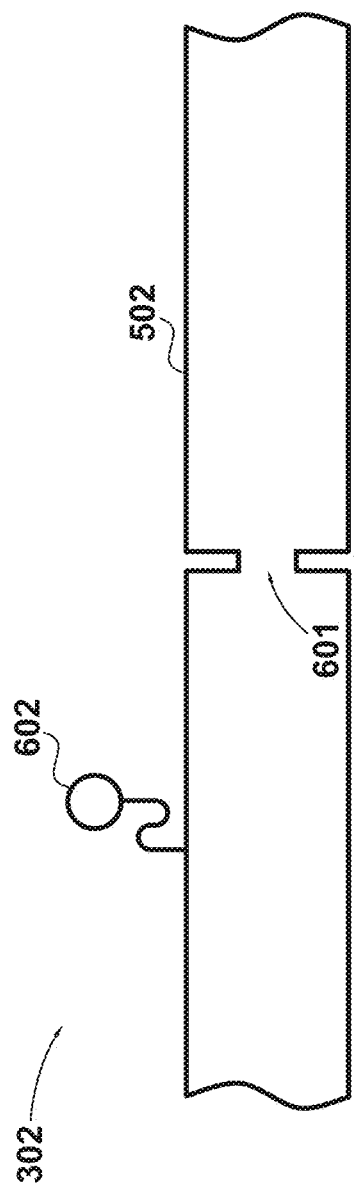
FIG. 6 shows a metering device of the fuel delivery system of FIG. 3.

A first embodiment of the metering device 302 is shown in FIG. 6 and comprises a choked sonic orifice 601 located in the main fuel conduit 302. Thus, in operation, the flow through the orifice is choked, i.e. it has a Mach number of 1. The flow is therefore a function only of the area of the orifice and upstream pressure and temperature, measured in this embodiment by a sensor 602. In order to ensure the orifice remains choked, the orifice 601 comprises an exit with no expansion, i.e. it is sharp-edged, and the ratio of upstream to downstream pressures is set to be at least the critical pressure ratio which, for hydrogen (a diatomic gas) is around 1.85.

Flow control is then achieved simply by adjusting the upstream pressure delivered by the pump 301, the upstream temperature being measured and the orifice area being known.

As an alternative, the metering device 302 could comprise a fixed but unchoked orifice across which a pressure differential may be measured across upstream and downstream taps using an appropriate sensor. Mass flow may then be derived with knowledge of upstream and downstream pressures and temperatures and the geometry of the fixed orifice.

Complex Cycles

As described previously, it is envisaged that the fuel delivery system 201 and fuel injection system 206 may be used in an embodiment of the core gas turbine 105 implementing a simple cycle as described with reference to FIG. 2, possibly with fuel cooling of engine or gearbox oil or cooling air. Alternatively, the core gas turbine engine 105 may implement a complex cycle.

Figure 7:
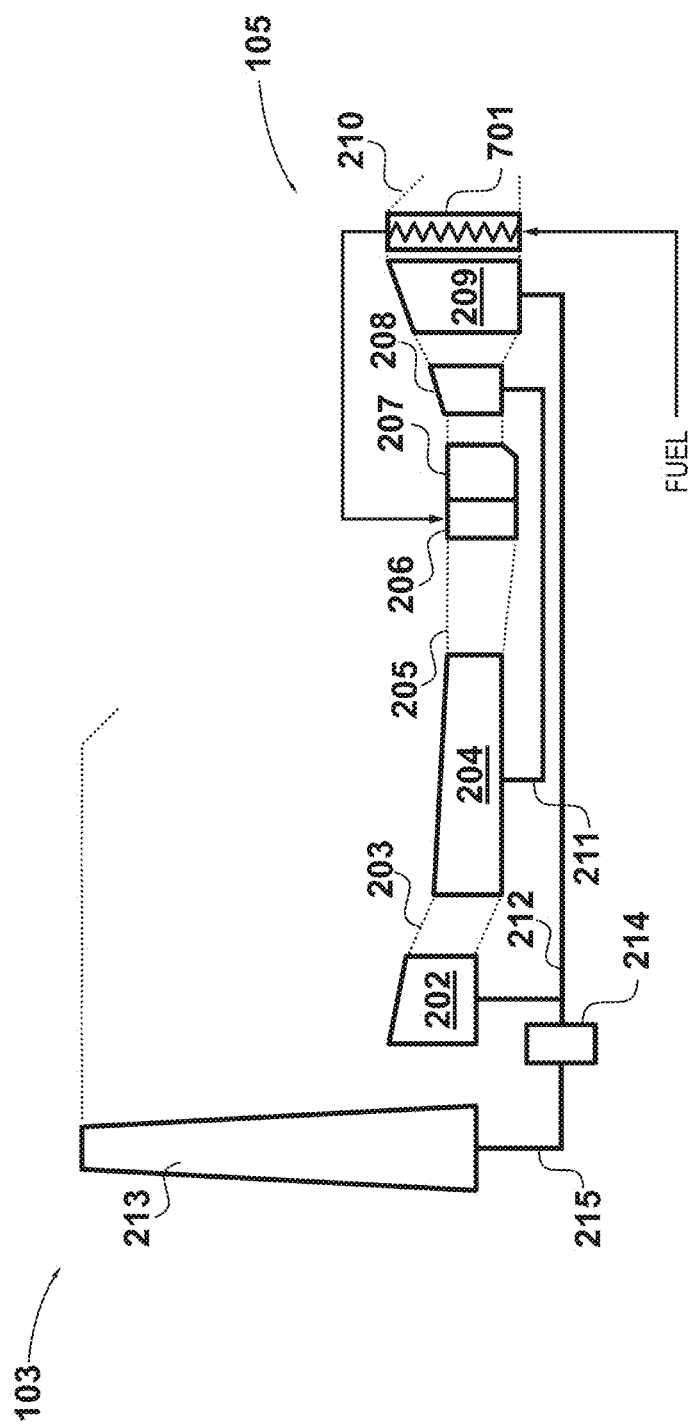
FIG. 7 shows a complex cycle including a recuperator.

A first embodiment of such a complex cycle is shown in FIG. 7 with like reference numerals used for matching features. In this example, the turbofan engine 103 and core gas turbine 105 are unchanged from their arrangement in FIG. 2, save for the addition of a recuperator 701 located between the low-pressure turbine 209 and core nozzle 210. The recuperator 701 forms part of the fuel heating system and is operable to heat hydrogen fuel by the exhaust stream of the core gas turbine 105. In this way, less fuel may be required to heat the hydrogen fuel to the injection temperature, increasing cycle efficiency.

In an embodiment, the recuperator 701 is a spiral-wound recuperator, which reduces the likelihood of fracture due to thermal expansion and contraction.

Figure 8:
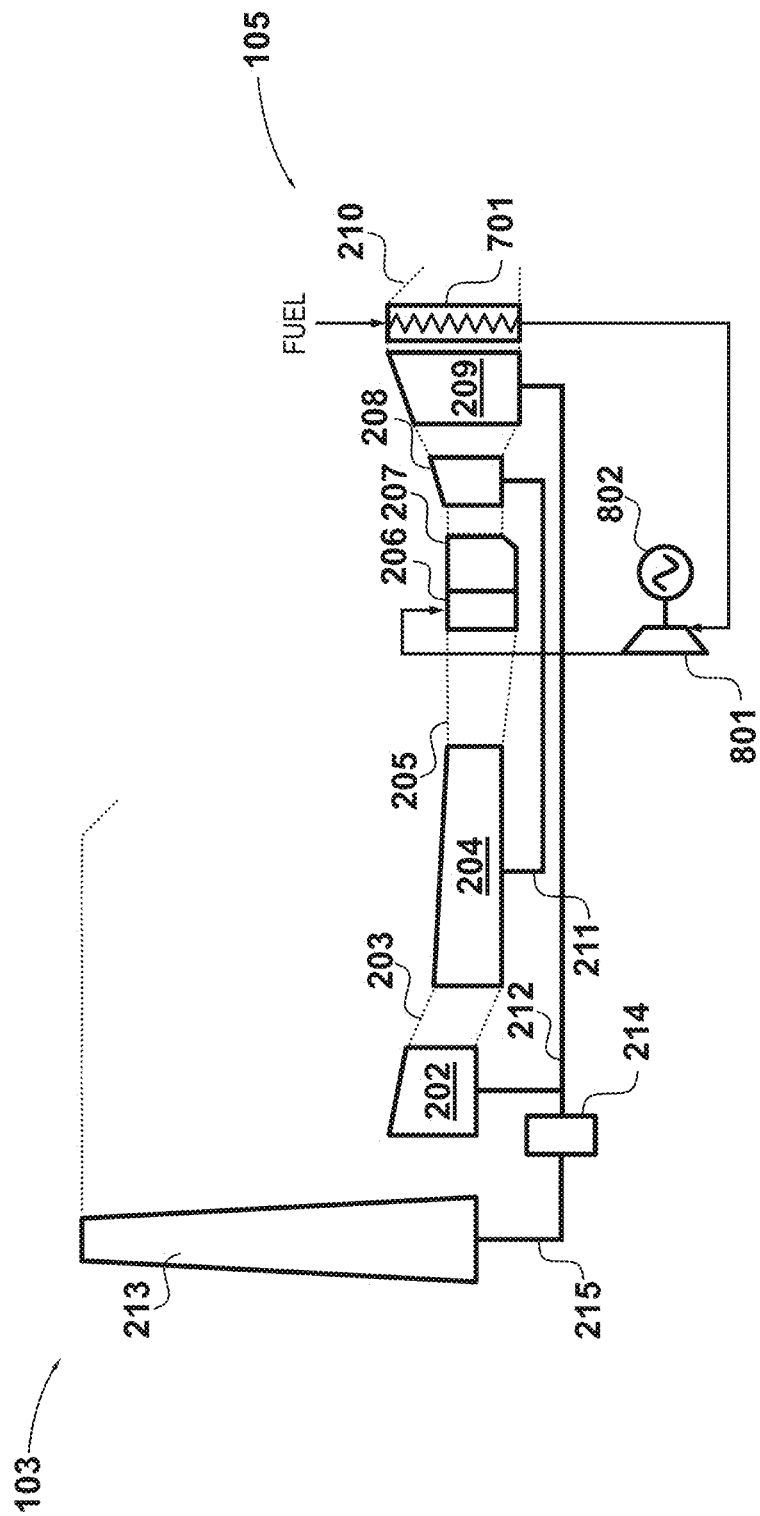
FIG. 8 shows another complex cycle including a recuperator and a fuel turbine.

Another embodiment of a complex cycle is shown in FIG. 8, which builds on the cycle of FIG. 7 with the inclusion of a fuel turbine 801. It will be appreciated that substantial energy recovery may be achieved from the exhaust stream if it is accepted that less thrust will be developed by the core nozzle 210. Thus, it is possible to heat the hydrogen fuel beyond the required fuel injection temperature and to recover work in the fuel turbine 801, which may be used to drive a load 802. In this example the load 802 is an electrical generator. In a specific embodiment, the electrical generator powers the fuel pump 301. Alternatively, the load could be the second shaft 212, with an appropriate drive mechanism being provided. In this way, the fuel turbine 801 augments the low-pressure turbine 209. It will be appreciated that other engine loads such as oil pumps etc. could also be driven by the fuel turbine 801.

Figure 9:
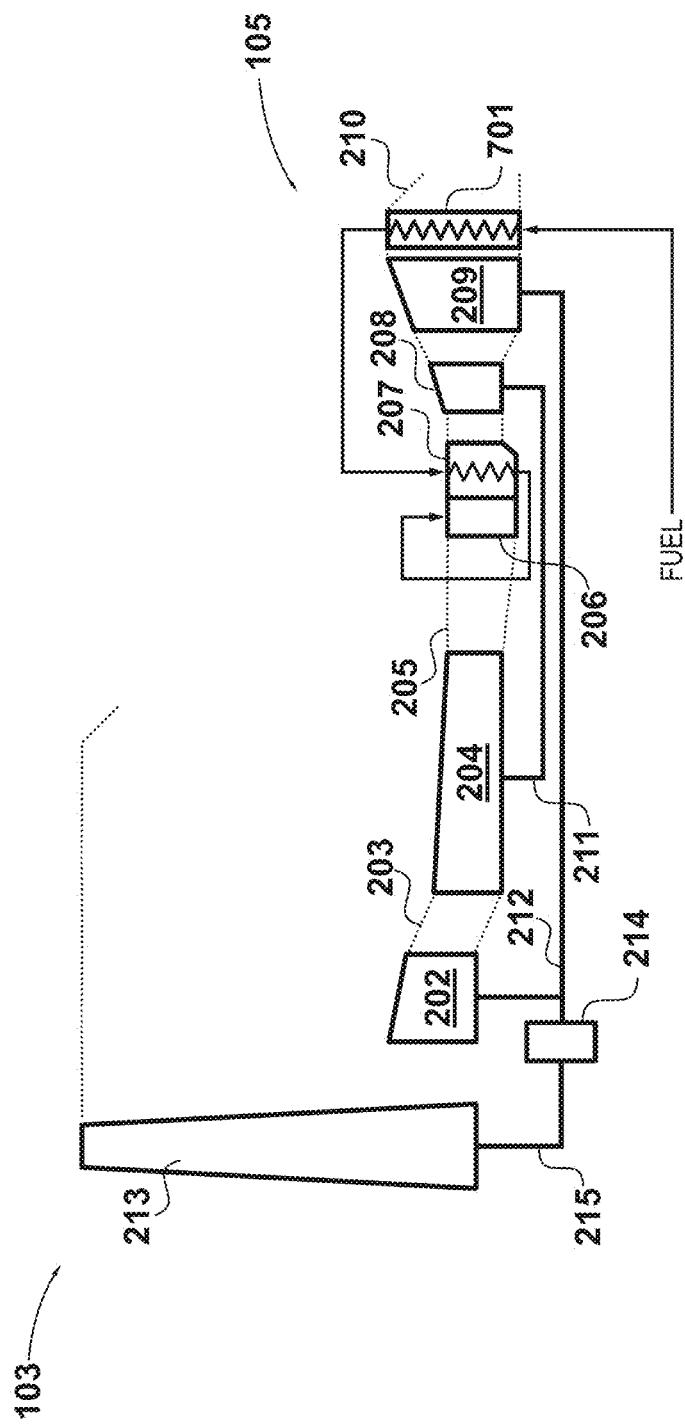
FIG. 9 shows another complex cycle including a recuperator and recuperative combustor cooling including a recuperator.

Additionally or alternatively, as shown in FIG. 9 it is possible to perform further recuperation by using the hydrogen fuel to cool the combustor 207. Gas turbine combustors feature a liner which needs to be cooled to maintain its mechanical integrity.

In conventional liquid-fuelled aero engines the combustor liner is cooled by the airflow drawn from atmosphere and which has passed through the compression system. This is typically via a single pass system in which the air passes through holes in the liner and to enter the main heat release region. Hence this air cannot be part of the combustion process and therefore leads to an increase in emissions and a decrease in cycle efficiency.

Thus, in an embodiment, the hydrogen fuel is flowed around the liner of the combustor 207. This scheme may be achieved by provision of for example helical cooling channels around the combustor 207 through which the hydrogen fuel may flow prior to injection.

Figure 10:
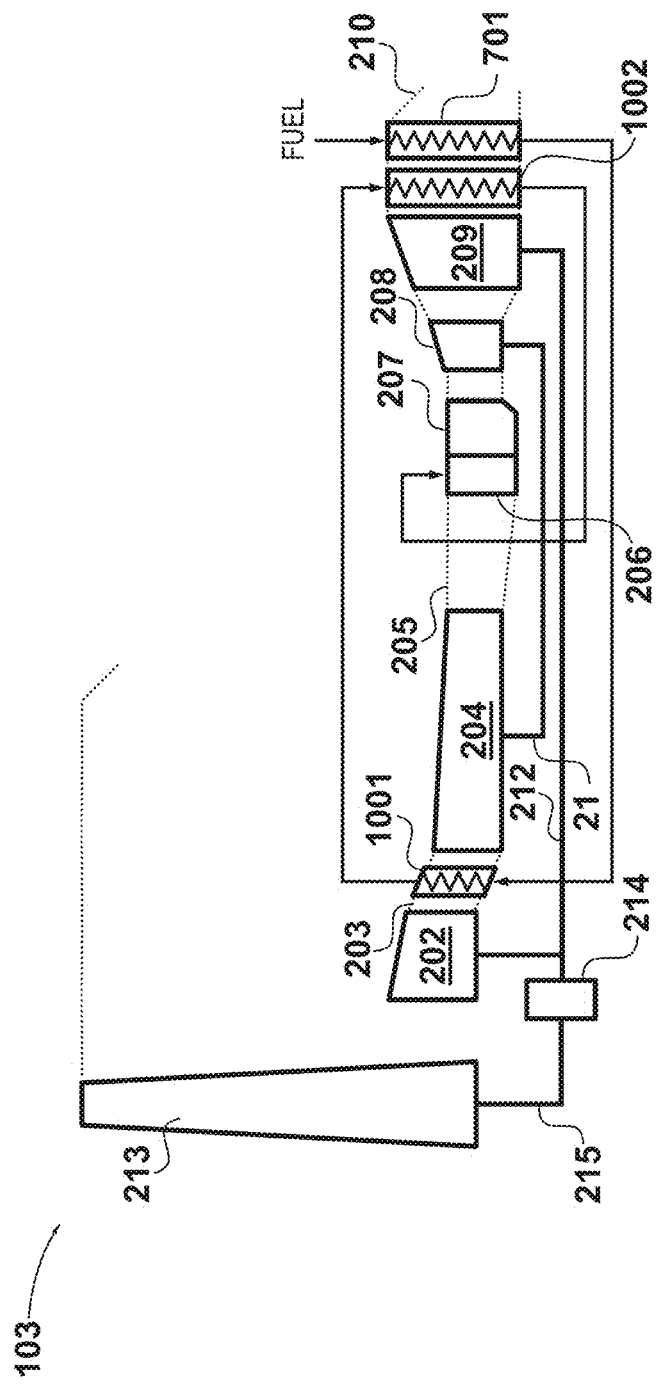
FIG. 10 shows another complex cycle including an intercooler and twin-pass recuperation.

Additionally or alternatively, as shown in FIG. 10 it is possible to provide intercooling and twin-pass recuperation.

In this embodiment, an intercooler 1001 is provided in the inter-stage duct 203 between the low-pressure compressor 202 and the high-pressure compressor 204 for cooling low-pressure compressor discharge air by the hydrogen fuel. In this way, the amount of compression work required to be performed by the high-pressure compressor 204 is reduced.

In this specific embodiment, a second recuperator 1002 is provided between the low-pressure turbine 209 and the recuperator 701 for further recuperative heating of the hydrogen fuel.

Thus, in this example, hydrogen fuel is first heated by the recuperator 701 to a temperature less than the low-pressure compressor 202 discharge air, which heats it further in the intercooler 1001. Further heating occurs in the second recuperator 1002, which has an inlet temperature higher than the recuperator 701. In this way, the temperature difference between the hydrogen fuel and the core gas turbine exhaust temperature is maximised in each recuperator.

Figure 11:
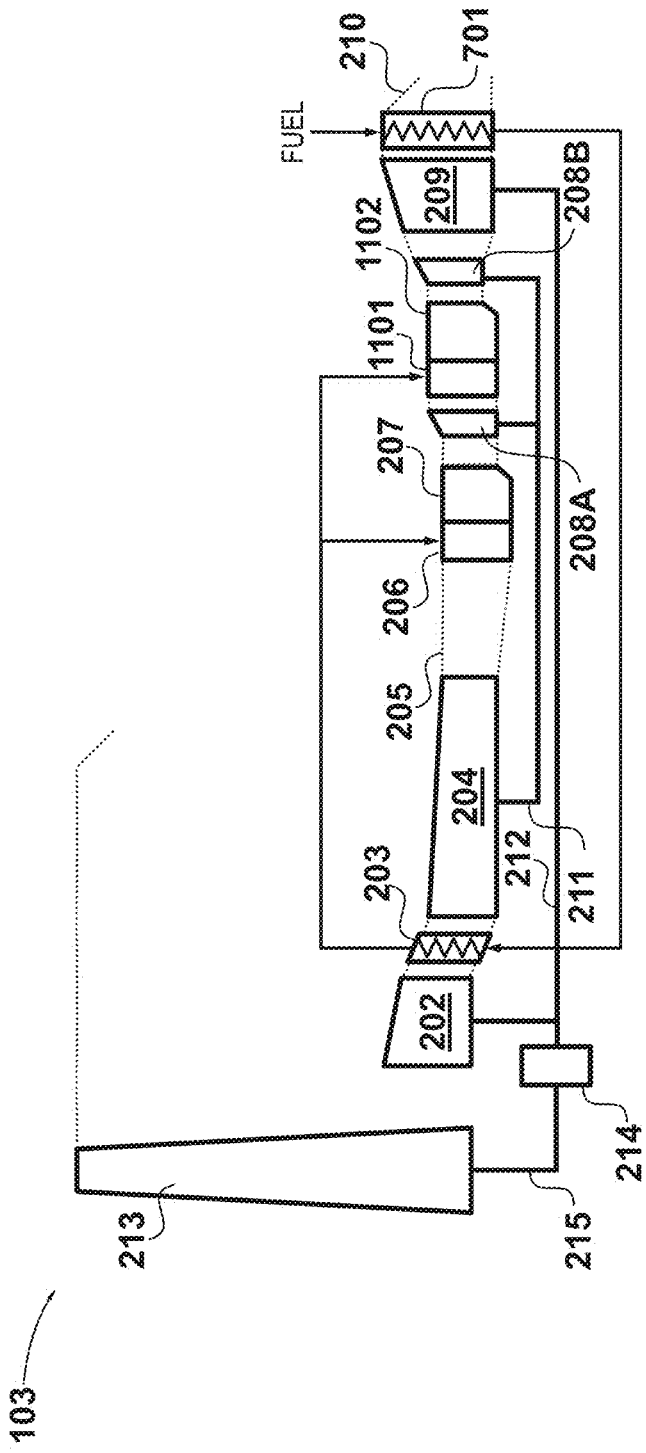
FIG. 11 shows another complex cycle including an intercooler, recuperation and inter-turbine reheat.

Additionally or alternatively, as shown in FIG. 11 a sequential combustion arrangement may be implemented to facilitate inter-turbine reheat. It will be appreciated that reheat of this type comprises additional stages of combustion to raise temperatures back to a maximum cycle temperature after a first stage of expansion. Along with intercooling, this moves the overall engine cycle closer to an Ericsson cycle, improving thermal efficiency substantially. In this specific example, the high-pressure turbine 208 is a multi-stage turbine and a reheat fuel injection system 1101 and reheat combustor 1102 are stationed between two of the stages 208A and 208B of the high-pressure turbine 208. Alternatively, the reheat fuel injection system 1101 and reheat combustor 1102 may be stationed between the high-pressure turbine 208 and the low-pressure turbine 209.

Fuel Injection System

Due to its wide flammability limits and reaction rates, there is significant risk of flashback in hydrogen fuel injection systems. Thus it is preferable to utilise a direct injection principle with low mixing times and high velocities, as opposed to attempting any form of pre-mixing. In order to minimise formation of oxides of nitrogen, residence time at high temperate must also be minimised. These constraints therefore favour a miniaturisation of the individual fuel injectors, sometimes referred to as "micromix" injectors.

Figure 12B:
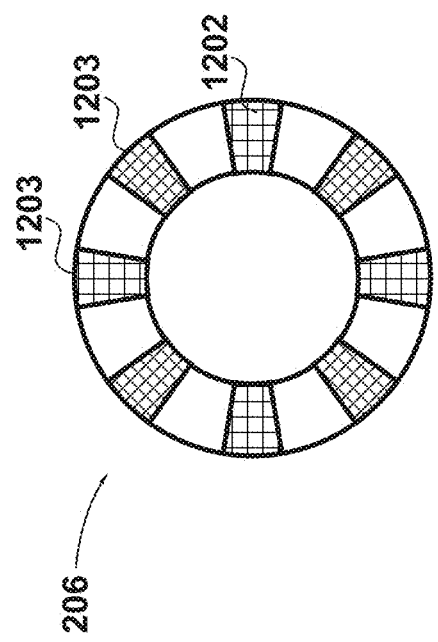
FIGS. 12A and 12B show two possible arrangements of the fuel injection system of the engines of FIG. 1.
Figure 12A:
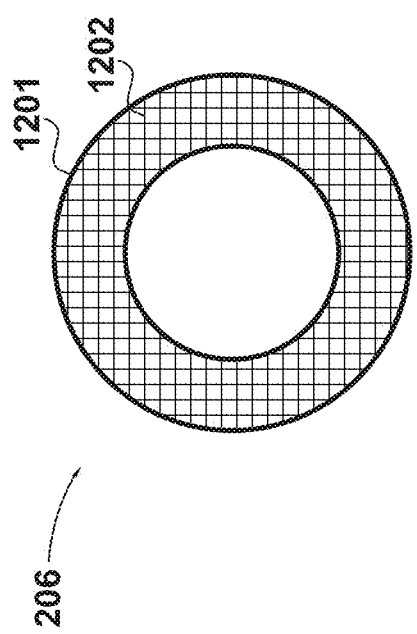

FIGS. 12A and 12B illustrate two possible arrangements of the fuel injection system 206. It will be appreciated that in the present embodiment the core gas turbine 105 employs an annular combustion system, and it will be clear how the principles disclosed herein may be adapted e.g. for tubular systems.

In the embodiment of FIG. 12A, the fuel injection system 206 comprises a full annulus 1201 of fuel injector blocks 1202. In the embodiment of FIG. 12B, the fuel injection system 206 comprises a plurality of sectors 1203 each comprising a subset of the totality of fuel injector blocks 1202. In both embodiments, the fuel injector blocks 1202 are configured with a geometry that substantially tessellates. It will be appreciated that the embodiment of FIG. 12A will produce a substantially more uniform circumferential heat-release profile, reducing the danger of hot streaks in the combustor 207 and uneven loading of the high-pressure turbine 208, improving performance by reducing cooling requirements.

It is contemplated that the fuel injection system 206 would comprise many hundreds or even thousands of fuel injector blocks 1202. For example, in an embodiment there are from 500 to 4000 fuel injector blocks, for example 1000 fuel injector blocks.

Figure 13:
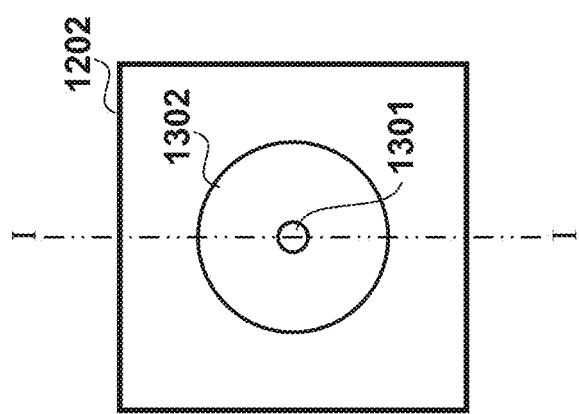
FIG. 13 shows an embodiment of a fuel injector block.

The configuration of one of the fuel injector blocks 1202 is shown in FIG. 13. The fuel injector block 1202 has a quadrilateral, in this specific embodiment a square, outer profile in the plane of tessellation. It will be appreciated that other outer profiles that tesselate could be used, for instance hexagonal or otherwise. In this example, the fuel injector block 1202 comprises a fuel admission duct 1301 and an air admission duct 1302.

Figure 14B:
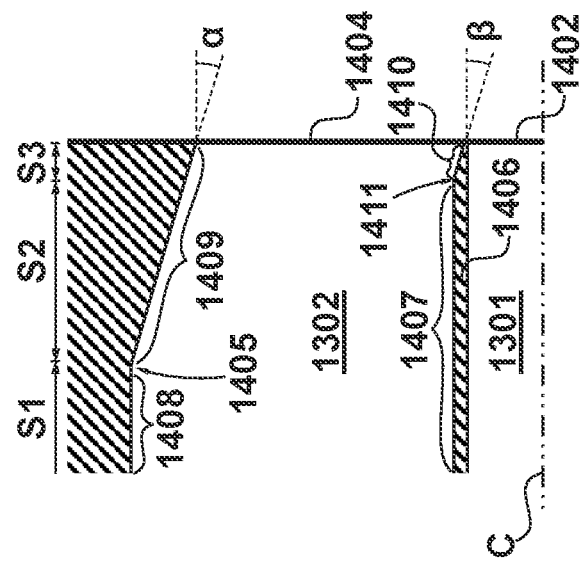
FIG. 14B is an enlargement of a portion of FIG. 14A.
Figure 14A:
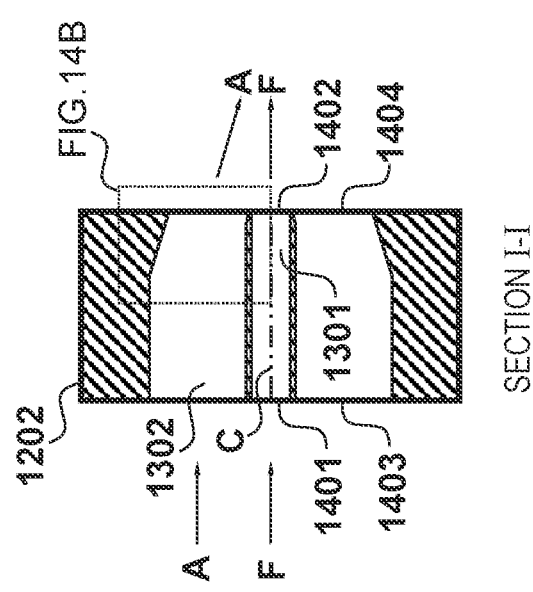
FIG. 14A shows the fuel injector block of FIG. 13 in cross section.

The fuel injector block 1202 is shown in cross-section in FIG. 14A along I-I of FIG. 13.

The fuel admission duct 1301 has an inlet 1401 for receiving fuel F from a fuel supply such as, for example, a manifold system (not shown, and which may also provide mechanical support for the fuel admission duct 1301), and an outlet 1402 for delivering the fuel F into a mixing zone in the combustor 207. The fuel admission duct 1301 has a central axis C extending from the inlet 1401 to the outlet 1402. In this specific embodiment, the fuel admission duct 1301 is cylindrical around the central axis C. It is contemplated that in other embodiments, the fuel admission duct 1301 could adopt a different geometry.

The air admission duct 1302 is located around the periphery of the fuel admission duct 1301. In the present embodiment, the air admission duct 1302 is concentric with the fuel admission duct 1301.

In the present embodiment, the air admission duct 1302 is located around the whole fuel admission duct 1301. It comprises an inlet 1403 for receiving air from the diffuser 205 and an outlet 1404 for delivering A into the mixing zone in the combustor 207. In the present example, the fuel admission duct 1301 and the air admission duct 1302 are coaxial around the central axis C, but in other embodiments they could for example be offset depending upon the overall design requirements.

In the specific embodiment of FIG. 14A, the air admission duct 1302 is configured to admit air at a non-zero angle relative to the central axis C, as shown by arrows A at the outlet 1404.

In an embodiment, the area of the outlet 1404 of the air admission duct 1302 is from 2 to 200 times greater than the area of the outlet 1402 of the fuel admission duct 1301. In another embodiment, it is from 5 to 180 times greater. In another embodiment, it is from 4 to 45 times greater. In another embodiment, it is from 25 to 35 times greater.

In an embodiment, the maximum dimension of the outlet 1404 of the air admission duct 1302 is from 2 to 15 times greater than the maximum dimension of the outlet 1402 of the fuel admission duct 1301. In this example, therefore, the maximum dimension corresponds to the diameters of the outlets 1402 and 1404. In embodiments in which the fuel admission duct 1301 or air admission duct 1302 are non-circular, this would be the maximum dimension of the selected shape, for example the diagonal if they were square. In another embodiment, the maximum dimension of the outlet 1404 of the air admission duct 1302 is from 4.3 to 6.75 times greater than the maximum dimension of the outlet 1402 of the fuel admission duct 1301.

In the present embodiment, the air admission duct contracts in terms of its area over its axial extent. In particular, the area of the inlet 1403 of the air admission duct 1302 is greater than the area of the outlet 1404 of the air admission duct 1302. In a specific embodiment, the area of the inlet of the air admission duct is from 1 to 1.5 times greater than the area of the outlet of the air admission duct.

This approach prevents stall and recirculation of flow at the immediate point of injection, which could be a possible ignition location and form an unwanted localised region of burning.

The contraction also minimises any non-uniformity in the airflow as it is admitted in the combustor 207. For example, wakes could be induced by the manifold system delivering hydrogen fuel into the fuel admission duct 1301. The contraction of the area of the air admission duct encourages acceleration of the airflow, and hence minimises circumferential variation in the airflow at the outlet 1404. In operation this provides a more uniform stoichiometry.

It has also been found that accelerating the airflow in the fuel injector block 1202 in this way minimises pressure losses by avoiding greater velocities further upstream of the injection point.

An enlargement of a portion of FIG. 14A is shown in FIG. 14B. In the present example, the air admission duct 1302 comprises a constant area section S1 from its inlet 1403 to a first intermediate position 1405, and a decreasing area section S2 between the first intermediate position 1405 and the outlet 1404.

In the present embodiment, the fuel admission duct 1301 is defined by a peripheral wall 1406 extending from its inlet 1401 to its outlet 1402.

In the illustrated embodiment, the constant area section 51 of the air admission duct 1302 is defined by a straight portion 1407 of the peripheral wall 1406 and a parallel, straight portion 1408 of the wall of air admission duct 1302. The decreasing area section S2 is defined by a combination of the straight portion 1407 of the peripheral wall 1406 and an inclined portion 1409 of the wall of air admission duct 1302. The inclined portion 1409 of the wall of air admission duct 1302 is inclined inward at an angle α relative to the central axis C. In the present example, α is equal to from 15 to 20 degrees. In a specific embodiment, a is equal to 17.3 degrees.

In the present example, the peripheral wall 1406 comprises a chamfered section 1410 between a second intermediate position 1411 and its outlet 1403. In this specific embodiment, the peripheral wall 1406 is chamfered in towards the central axis C with an angle β.

In the present example, β is equal to from 15 to 20 degrees. In a specific embodiment, β is equal to 17.3 degrees.

The chamfer 1410 prevents flame holding at the outlet 1403, thereby reducing the tendency for a lifted flame to form. This translates the primary heat release zone further downstream from the injector block 1202, reducing the degree of cooling required for the injector block 1202.

In the illustrated embodiment, β is equal to α. Thus over the axial extent of a section S3 defined between the second intermediate position 1411 and the outlet 1403, the air admission duct 1302 does not diverge which would decelerate the airflow. The incline at angle α=β also encourages delivery of airflow A into the mixing zone at this angle. It is envisaged that in other embodiments a could be greater than β and thus the air admission duct 1302 would continue to contract in section S3.

When the chamfer 1410 is combined with the inclined portion 1409 of the air admission duct 1302, any separation induced by the chamfer 1410 is also prevented. Further, the acceleration caused by the contraction reduces the thickness of the boundary layer formed on the peripheral wall 1406 in the air admission duct 1302. This increases fuel-air shear at the outlets 1402 and 1404 and maximises mixing.

Figure 15A:
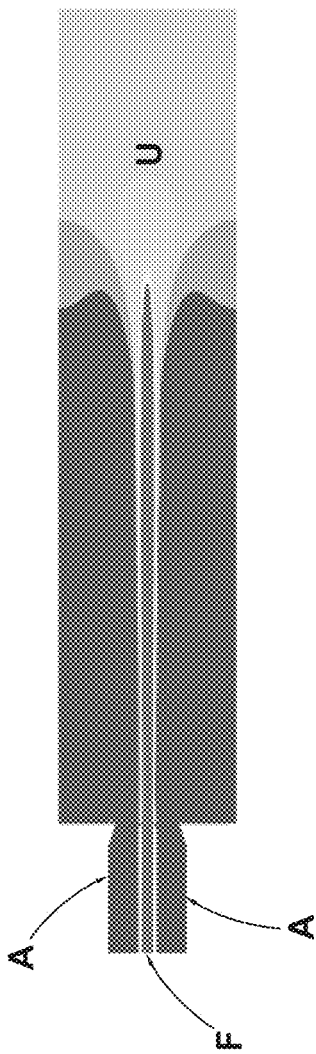
FIG. 15A shows simulated equivalence ratios downstream of the fuel injector block of FIG. 14A.

FIG. 15A shows a simulation of equivalence ratios downstream of the fuel injector block 1202, and was obtained by a periodic isothermal CFD simulation on this configuration. In this example, the fuel admission duct 1301 was sized with a 0.5 millimetre internal diameter and a peripheral wall thickness of 0.1 millimetres. The inlet 1403 of the air admission duct 1302 had a 3.29 millimetre diameter, and the outlet 1404 had a 2.69 millimetre diameter giving an area ratio therebetween of 1.25. Both α and β were 17.3 degrees. A uniform equivalence ratio U was achieved within 30 millimetres of the injection point.

Figure 15B:
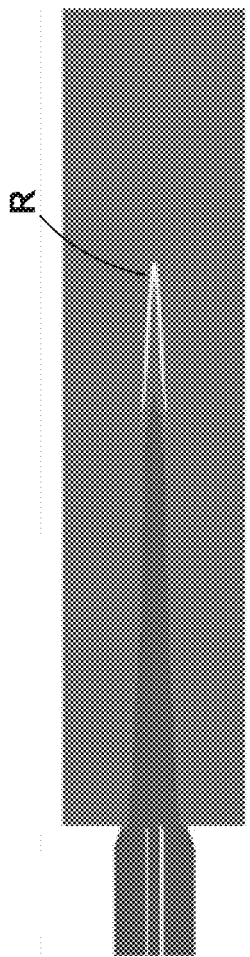
FIG. 15B shows a simulated $H_2O_2$ contour downstream of the fuel injector block of FIG. 14A.

FIG. 15B shows a simulated $H_2O_2$ contour, with the reaction R occurring around 25 millimetres from the injection point, hence allowing the combustor 207 to be made more compact than a conventional aero combustor.

Figure 16B:
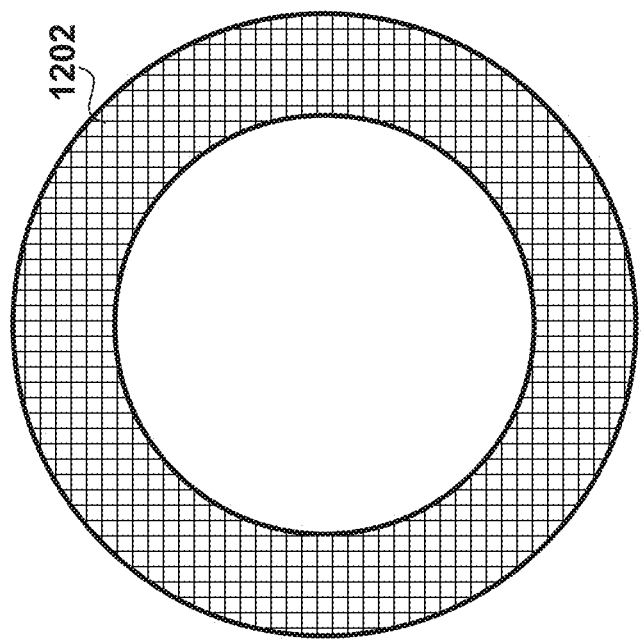
FIGS. 16A and 16B show the invariance of injector block size with power scaling of engine and fuel injection system.
Figure 16A:
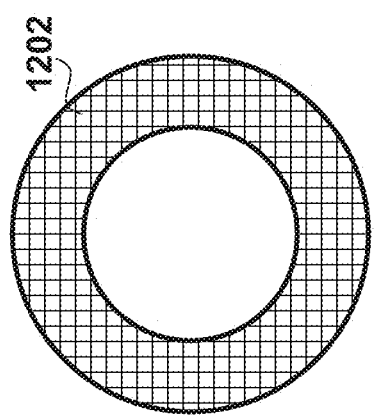

By defining fuel injector blocks 1202 of small scale relative to the overall size of the fuel injection system annulus, the flow field in the combustor 207 becomes self-similar and substantially invariant over different practical sizes. An example is shown in FIG. 16A and 16B of how the core gas turbine 105 may undergo a power scaling, i.e. the use of a substantially common design for two different power levels. In this example, the fuel injection system 206 is sized for an engine with power P in FIG. 16A, and a power 2P in FIG. 16B. However, it will be seen that the size of the fuel injector blocks 1202 has not changed between the two designs, there has simply been an increase of the number making up the overall annulus.

Thus, in an industrial setting, the design process for a new specification engine may simply comprise obtaining a design of a standardised fuel injector block, such as fuel injector block 1202. The standard specification for such an injector block would comprise its capability in terms of fuel mass flow performance and its dimensions and geometry. Engine performance data, typically derived prior to detailed component design, would set the required fuel mass flow requirements for the new engine type.

A simple evaluation of the quantity of standardised fuel injector blocks that meets the fuel mass flow requirements for the engine may then be performed. This would not require any dimensional scaling of the standardised fuel injectors, and indeed this would be discouraged as the flow field would change.

Referring again briefly to FIG. 2, it can be seen that the adoption of a micromix-type direct injection system as described herein facilitates a much shorter combustor 207. Thus for the same overall axial length of the core gas turbine 105, it is possible to increase the axial length available for the diffuser 205. In this way, improved control over the diffusion process may be achieved rather than the conventional dump diffuser designs utilised on conventional liquid-fuelled aero engines which require much longer combustor lengths due to the slower combustion processes associated with liquid hydrocarbon fuels. Thus in an embodiment, the axial length of the diffuser 205 is greater than the axial length of the combustor 207. In an embodiment, the diffuser is a faired diffuser which improves the uniformity of the flow delivered to the fuel injection system 206.

Various examples have been described, each of which comprise one or more combinations of features. It will be appreciated by those skilled in the art that, except where clearly mutually exclusive, any of the features may be employed separately or in combination with any other features and thus the disclosed subject-matter extends to and includes all such combinations and sub-combinations of the one or more features described herein.

The invention claimed is:

1. A direct injection fuel system for injecting hydrogen fuel into a gas turbine combustor, the direct injection fuel system comprising a plurality of fuel injector blocks, each of the plurality of fuel injector blocks includes:
   a fuel admission duct having an inlet for receiving the hydrogen fuel from a fuel supply, an outlet for delivering the hydrogen fuel into the gas turbine combustor and a central axis extending from said inlet to said outlet;
   an air admission duct located around the fuel admission duct, having an inlet for receiving an air from a diffuser and an outlet for delivering the air into the gas turbine combustor for mixing with the hydrogen fuel, wherein:
   the air admission duct comprises a constant area section from the inlet of the air admission duct to a first intermediate position, and a decreasing area section between the first intermediate position to the outlet of the air admission duct,
   the fuel admission duct is defined by a peripheral wall extending from the inlet to the outlet of the fuel admission duct, said peripheral wall having a chamfered section that is angled at a first angle relative to the central axis and extends between a second intermediate position and the outlet of the fuel admission duct,
   the decreasing area section is defined by an inclined portion of a wall of the air admission duct inclined inward at a second angle relative to the central axis; and
   the second angle of the inclined portion and the first angle of the chamfered section are inclined at a same angle relative to the central axis, and both of the first angle and the second angle are each between 15 and 20 degrees.

2. The direct injection fuel system of claim 1, in which each of the air admission ducts is configured to inject the air at a non-zero angle relative to the respective central axis.

3. The direct injection fuel system of claim 1, in which an area of the outlet of each of the air admission ducts is from 2 to 200 times greater than an area of the outlet of the respective fuel admission duct.

4. The direct injection fuel system of claim 3, in which the area of the outlet of each of the air admission ducts is from 4 to 45 times greater than the area of the outlet of the respective fuel admission duct.

5. The direct injection fuel system of claim 3, in which the area of the outlet of each of the air admission ducts is from 5 to 180 times greater than the area of the outlet of the respective fuel admission duct.

6. The direct injection fuel system of claim 3, in which the area of the outlet of each of the air admission ducts is from 25 to 35 times greater than the area of the outlet of the respective fuel admission duct.

7. The direct injection fuel system of claim 1, in which a maximum dimension of the outlet of each of the air admission ducts is from 2 to 15 times greater than a maximum dimension of the outlet of the respective fuel admission duct.

8. The direct injection fuel system of claim 7, in which the maximum dimension of the outlet of each of the air admission ducts is from 4.3 to 6.75 times greater than the maximum dimension of the outlet of the respective fuel admission duct.

9. The direct injection fuel system of claim 1, in which each of the air admission ducts is concentric with the respective fuel admission duct.

10. The direct injection fuel system of claim 9, for each of the plurality of fuel injector blocks, an area of the inlet of the air admission duct is greater than an area of the outlet of the air admission duct.

11. The direct injection fuel system of claim 10, for each of the plurality of fuel injector blocks, the area of the inlet of the air admission duct is from 1 to 1.5 times greater than the area of the outlet of the air admission duct.

12. The direct injection fuel system of claim 1, wherein a number of the plurality of fuel injector blocks comprised in the direct injection fuel system is from 500 to 4000.

13. The direct injection fuel system of claim 1, for each of the plurality of fuel injector blocks, the peripheral wall defined the fuel admission duct has:
- a straight portion that is parallel to the central axis, and the chamfered section,
- wherein the straight portion and the chamfered section are directly connected at the second intermediate position.

14. The direct injection fuel system of claim 1, for each of the plurality of fuel injector blocks, the wall of the air admission duct has:
- a straight portion that is parallel to the central axis, and the inclined portion,
- wherein the straight portion and the inclined portion are directly connected at the first intermediate position.

15. The direct injection fuel system of claim 1, for each of the plurality of fuel injector blocks, the chamfered section is located at an outer radial side of the peripheral wall and the inclined portion is located at an inner radial side of the wall of the air admission duct.

16. The direct injection fuel system of claim 1, for each of the plurality of fuel injector blocks, the inclined portion is longer along the central axis than the chamfered section.

\* \* \* \* \*